G. D. SUNDSTRAND.
LISTING AND ADDING MACHINE.
APPLICATION FILED MAR. 11, 1912.
1,329,028.
Patented Jan. 27, 1920.
12 SHEETS—SHEET 1.
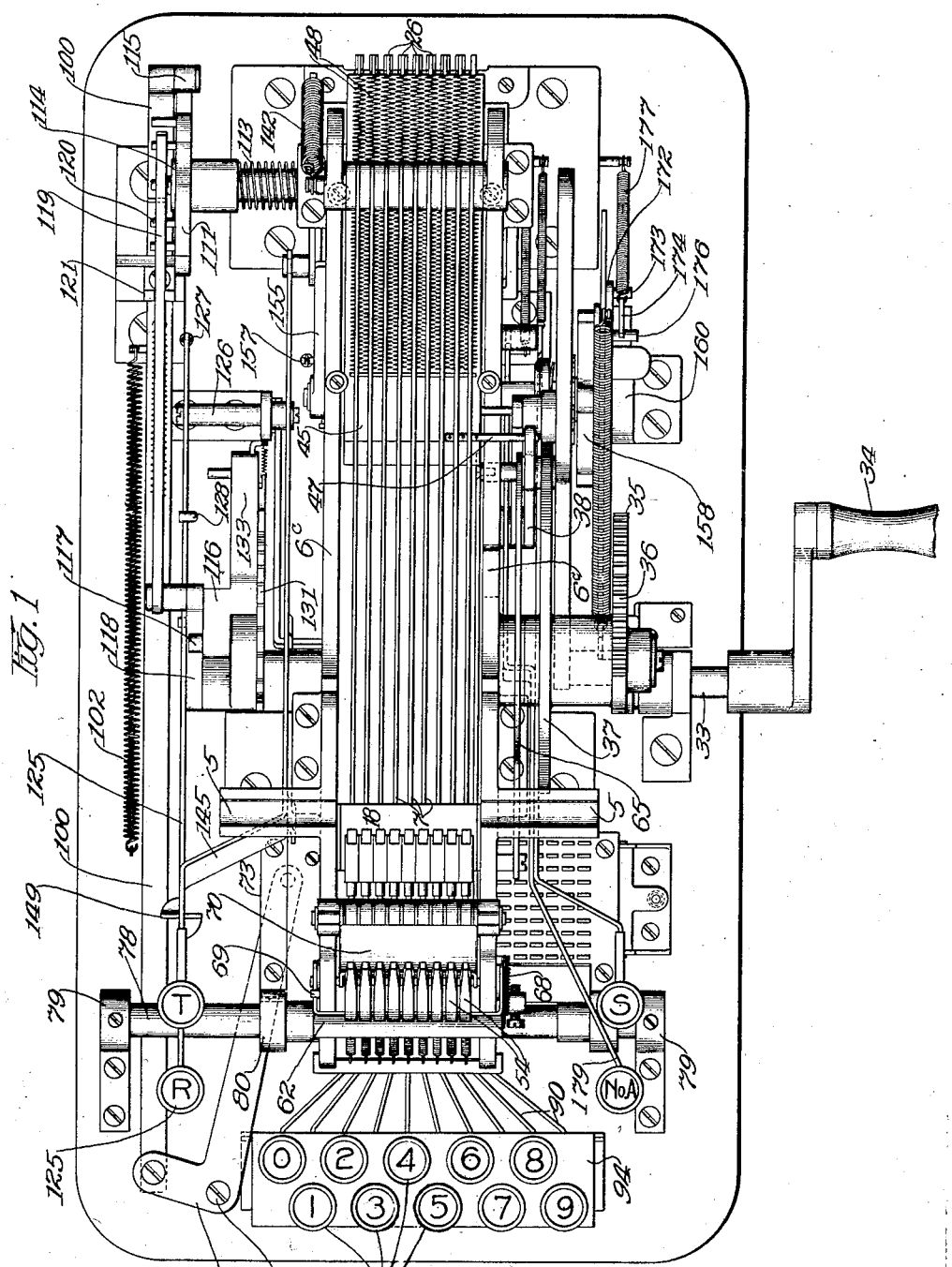

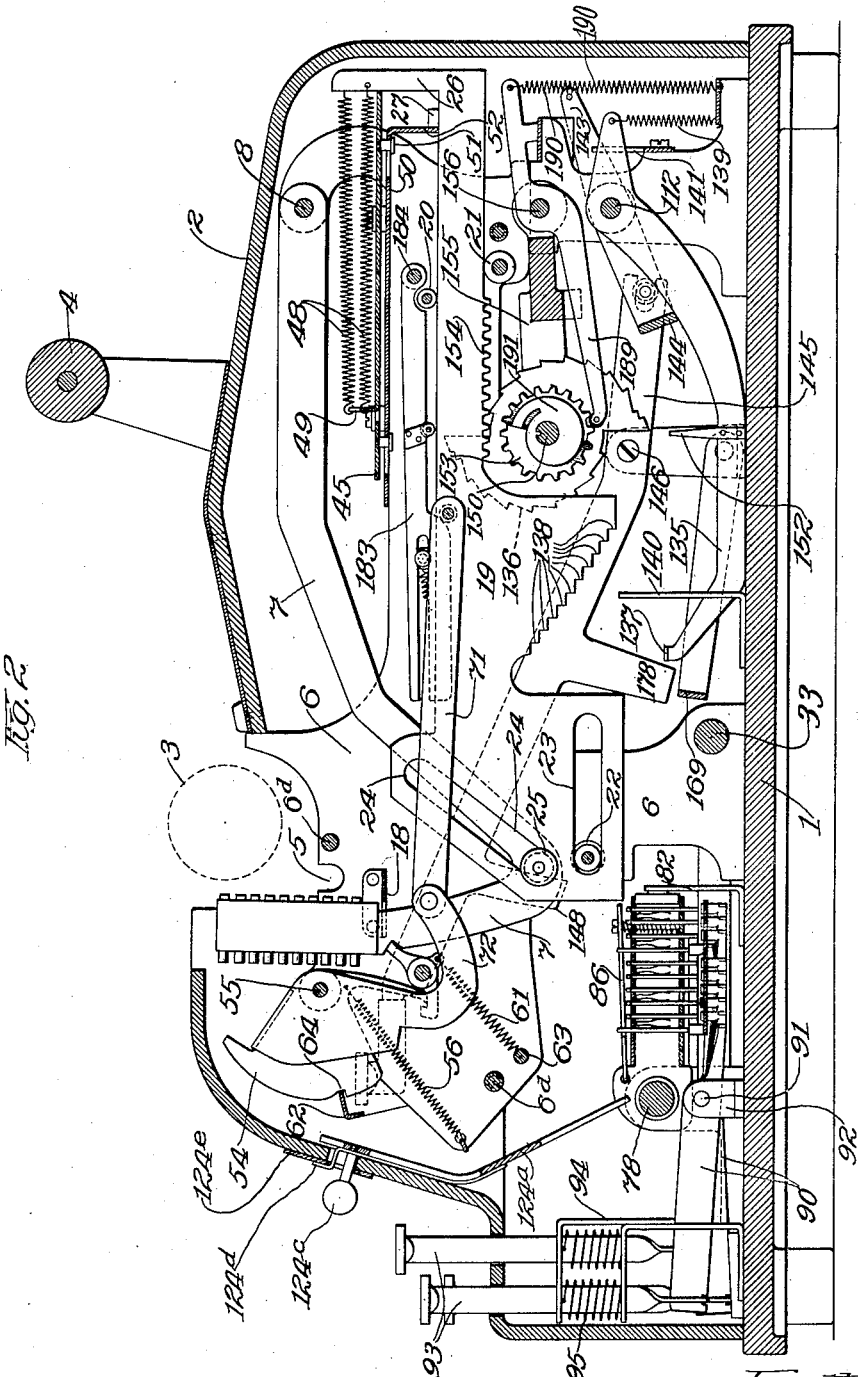

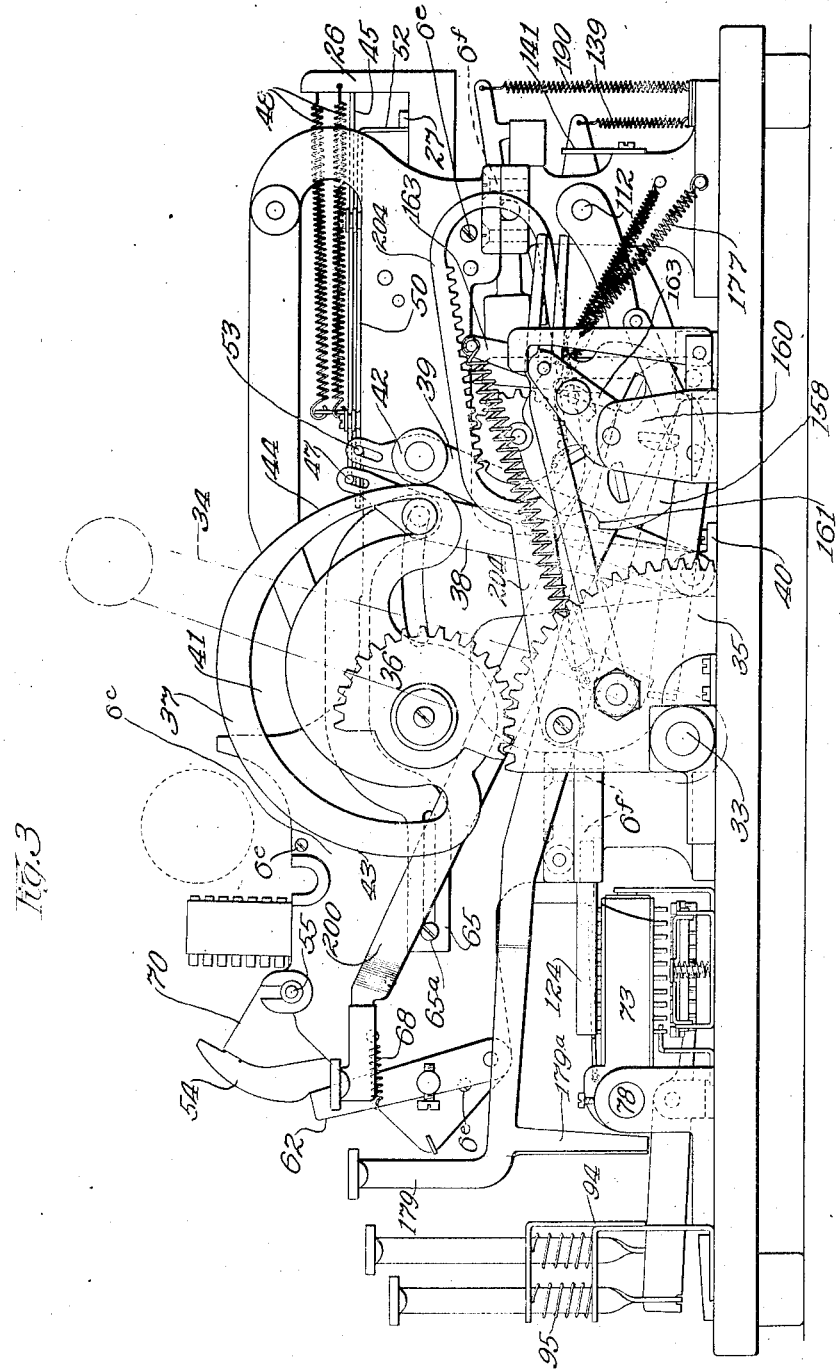

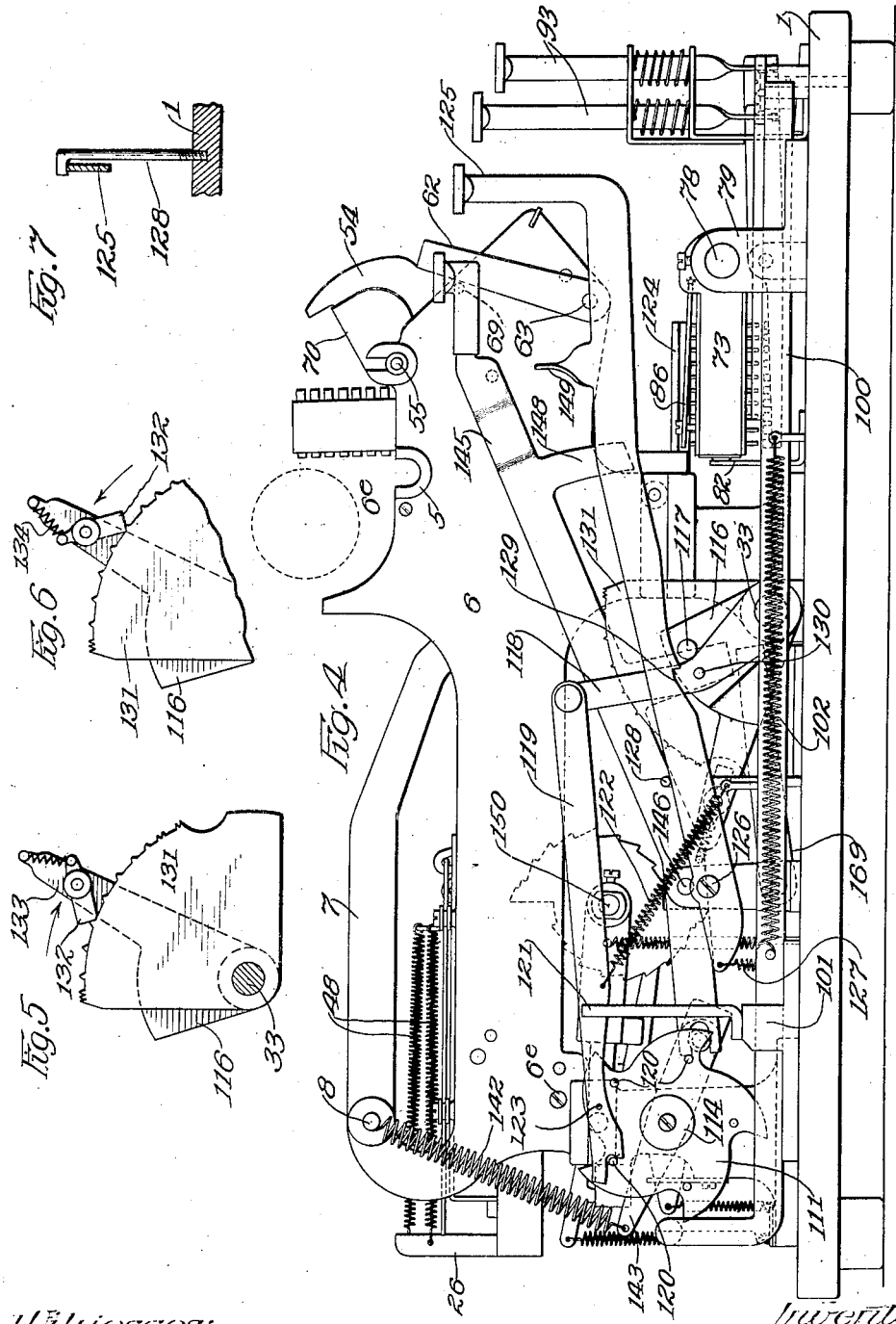

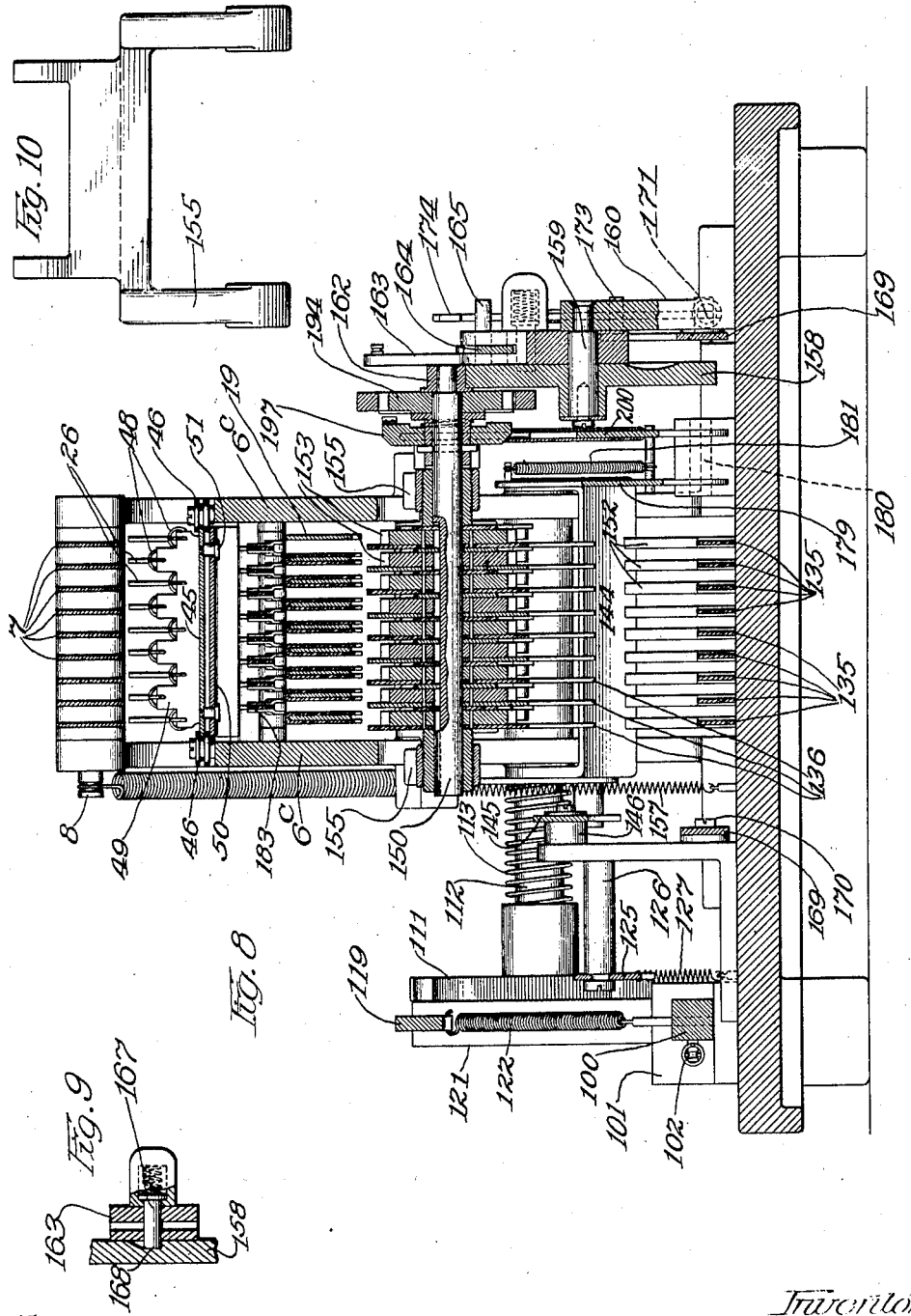

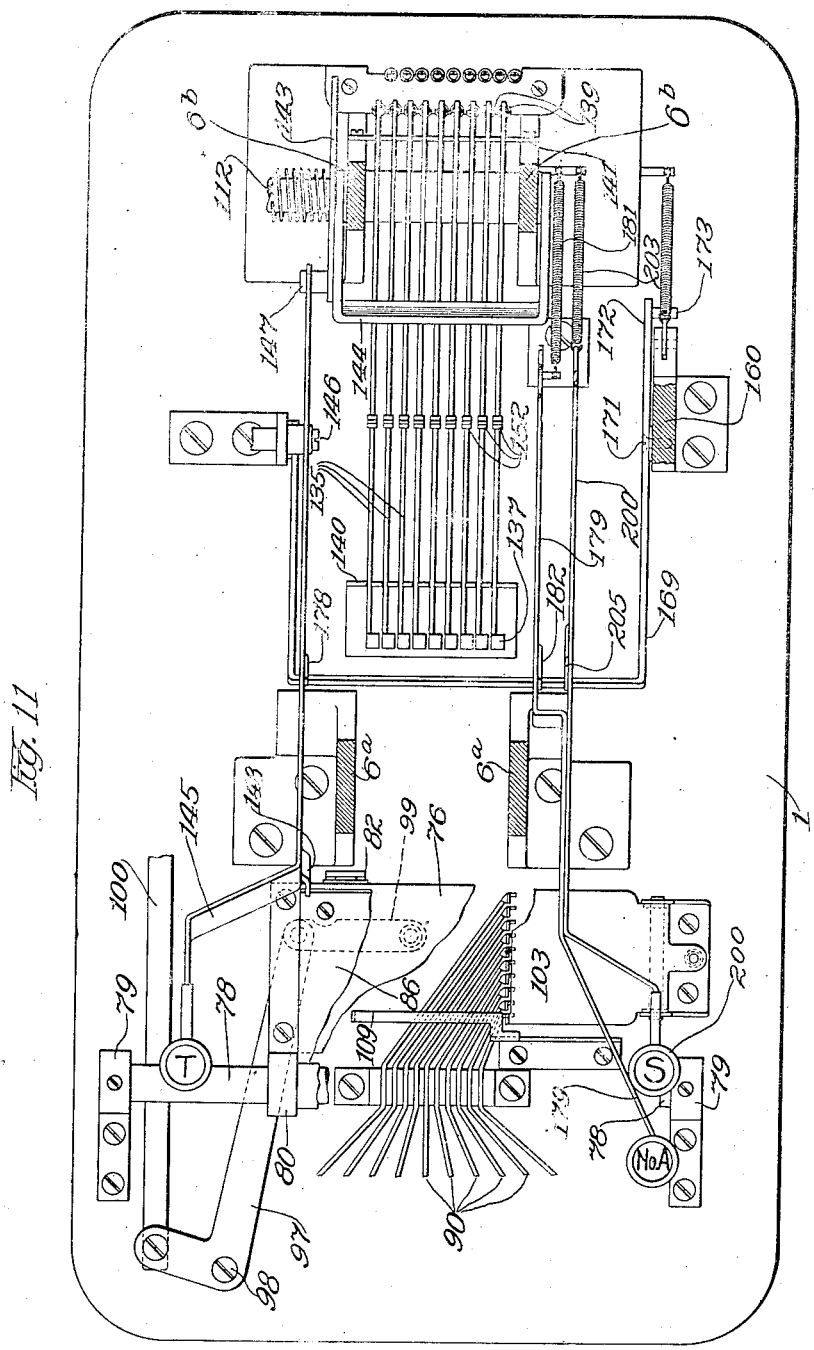

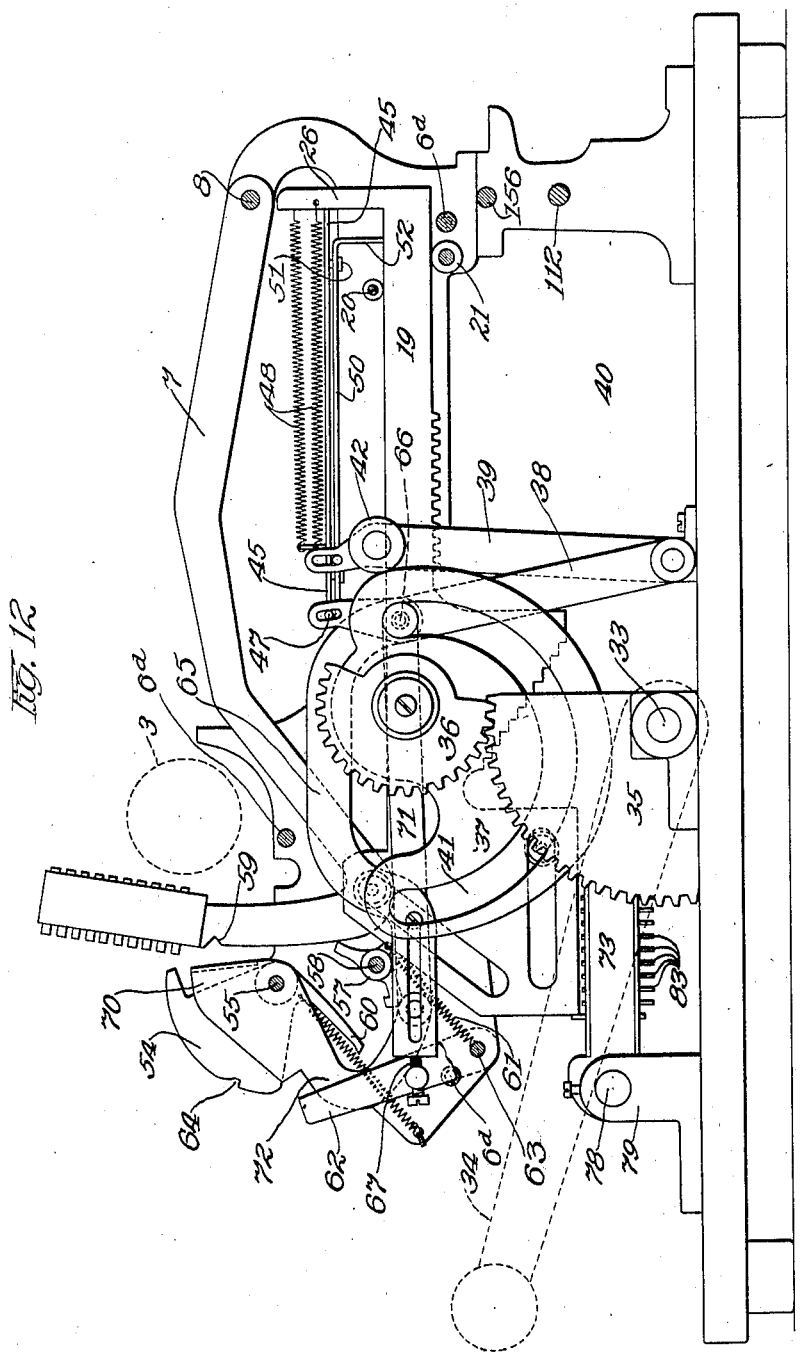

G. D. SUNDSTRAND.
LISTING AND ADDING MACHINE.
APPLICATION FILED MAR. 11, 1912.

1,329,028.

Patented Jan. 27, 1920.

12 SHEETS—SHEET 8.

Witnesses:
H. F. Tutt
George L. Chindahl

Inventor:
Gustaf David Sundstrand,
By Luther L. Miller
Atty.

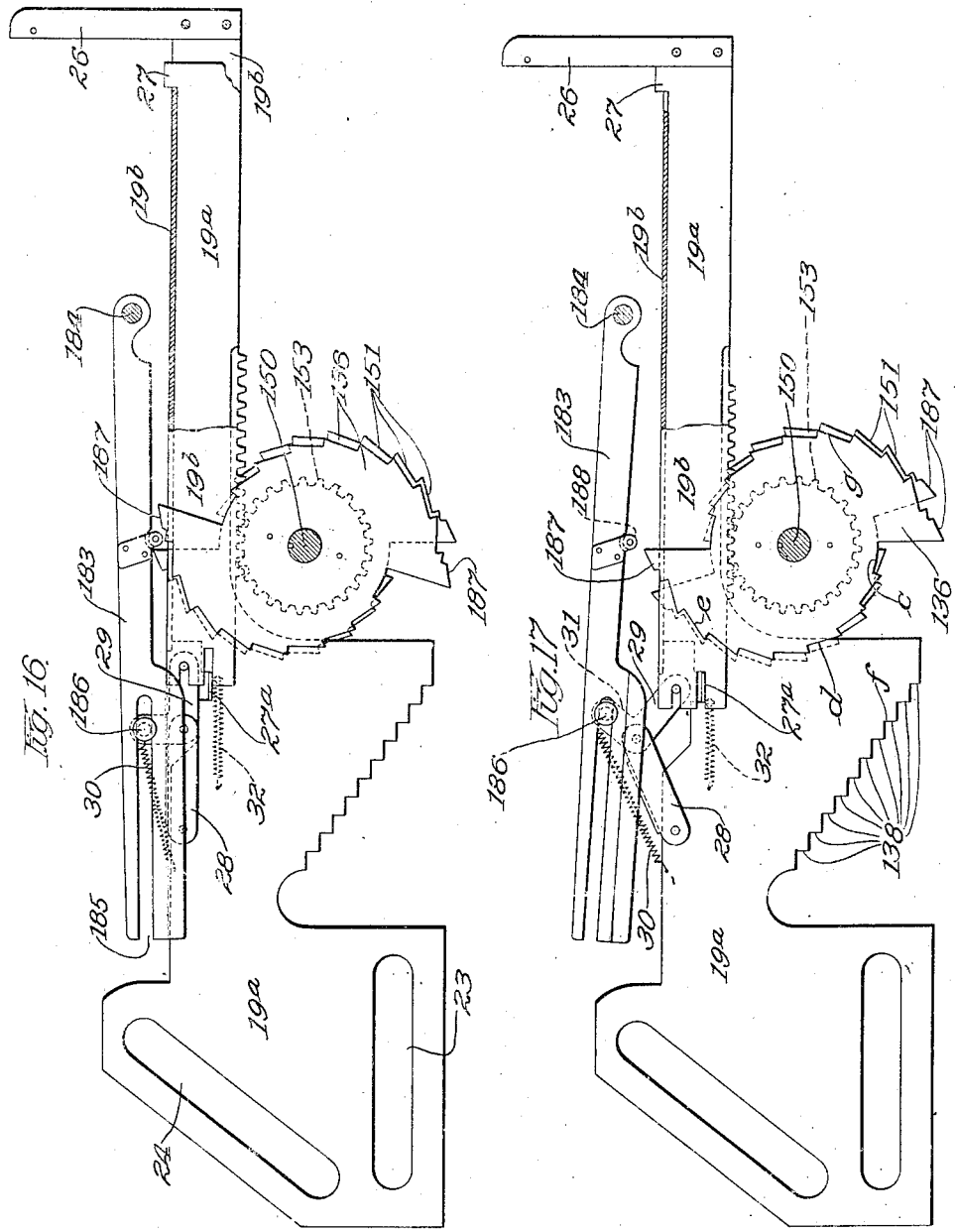

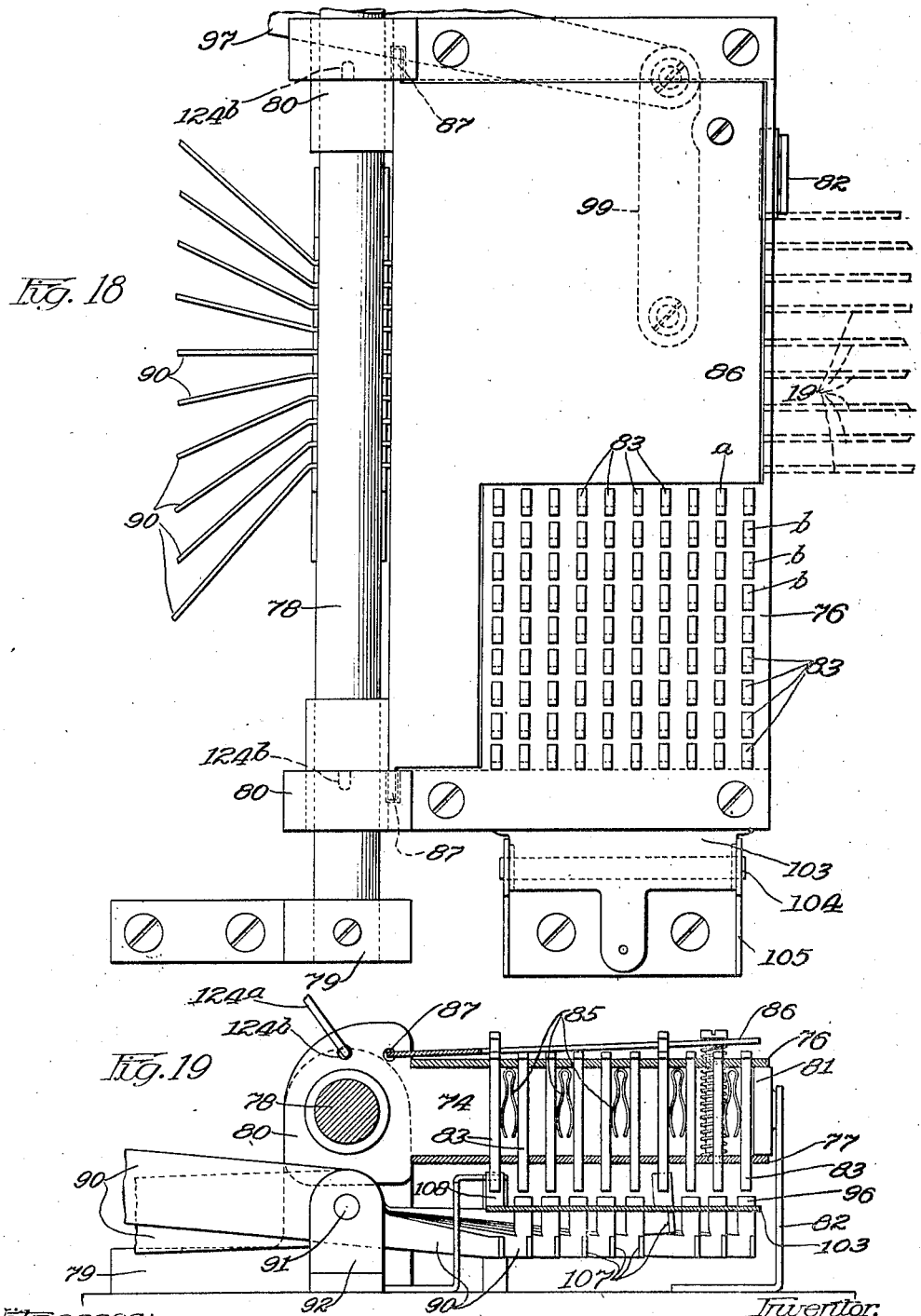

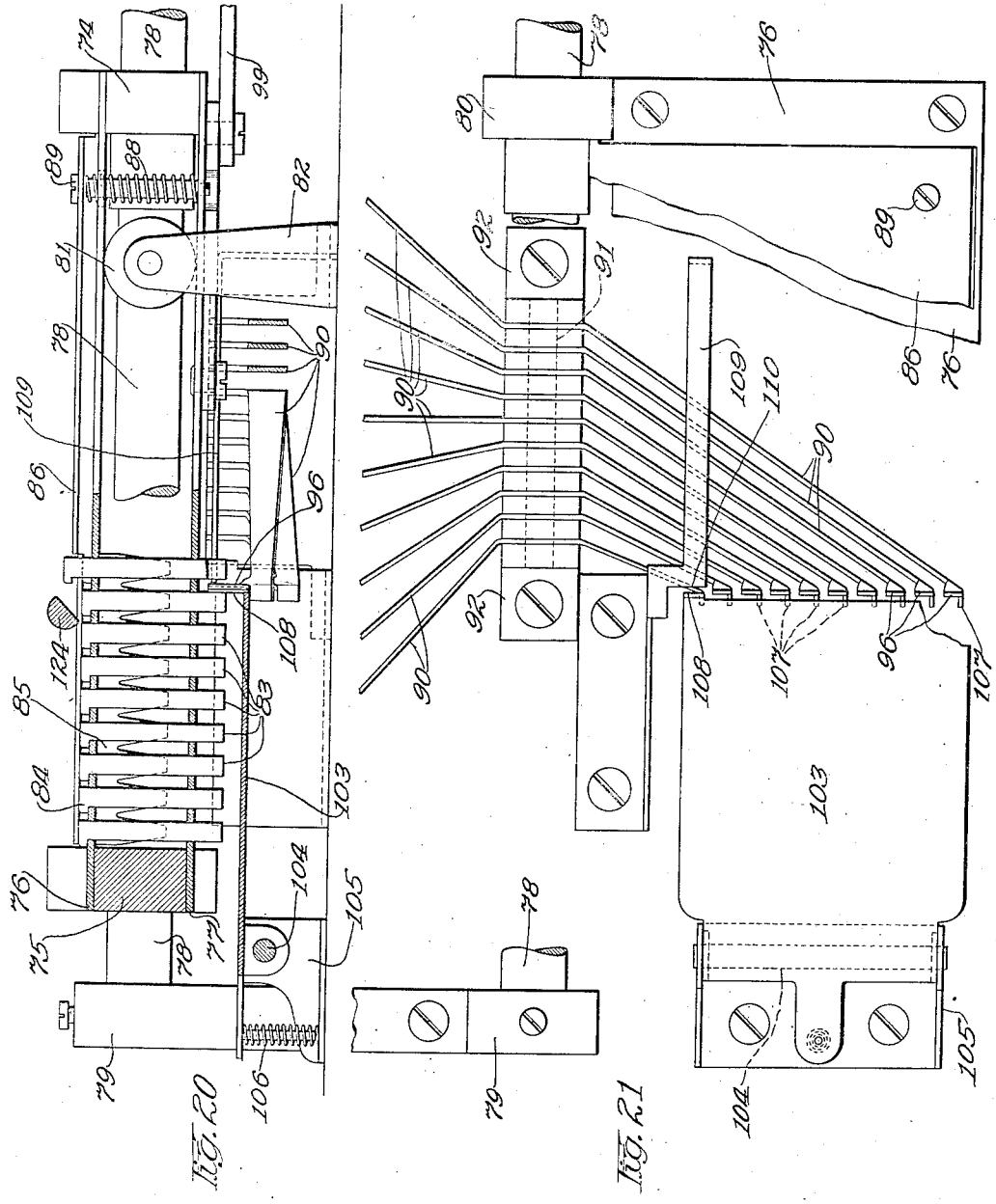

G. D. SUNDSTRAND.
LISTING AND ADDING MACHINE.
APPLICATION FILED MAR. 11, 1912.
1,329,028.
Patented Jan. 27, 1920.
12 SHEETS—SHEET 12.
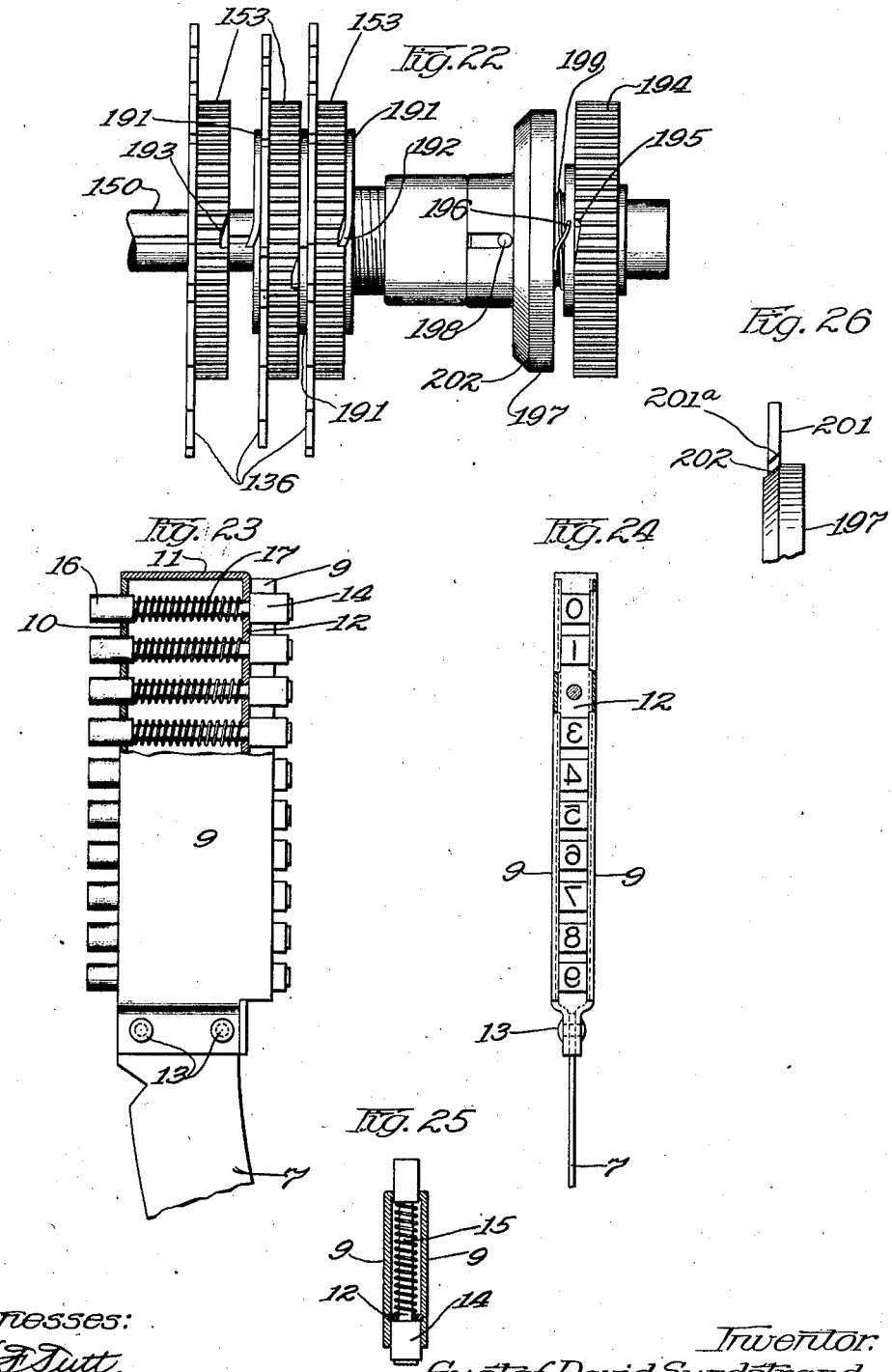
Witnesses:
H. F. Tutt.
George L. Chridahl
Inventor:
Gustaf David Sundstrand.
By Luther L. Miller
Atty.

UNITED STATES PATENT OFFICE.

GUSTAF DAVID SUNDSTRAND, OF ROCKFORD, ILLINOIS, ASSIGNOR TO ROCKFORD MILLING MACHINE COMPANY, OF ROCKFORD, ILLINOIS, A CORPORATION OF ILLINOIS.

LISTING AND ADDING MACHINE.

1,329,028.   Specification of Letters Patent.   Patented Jan. 27, 1920.

Application filed March 11, 1912. Serial No. 682,971.

*To all whom it may concern:*

Be it known that I, GUSTAF DAVID SUNDSTRAND, a citizen of the United States, residing at Rockford, in the county of Winnebago and State of Illinois, have invented certain new and useful Improvements in Listing and Adding Machines, of which the following is a specification.

The listing and adding machines of the prior art have comprised a large number of parts, with consequent liability to derangement and considerable cost of manufacture. It is one of the objects of this invention to simplify the construction of machines of this class, and thereby reduce their cost and render them more durable and reliable.

Further objects and advantages of the invention will appear from the following detailed description of one embodiment of the invention.

Figure 13:
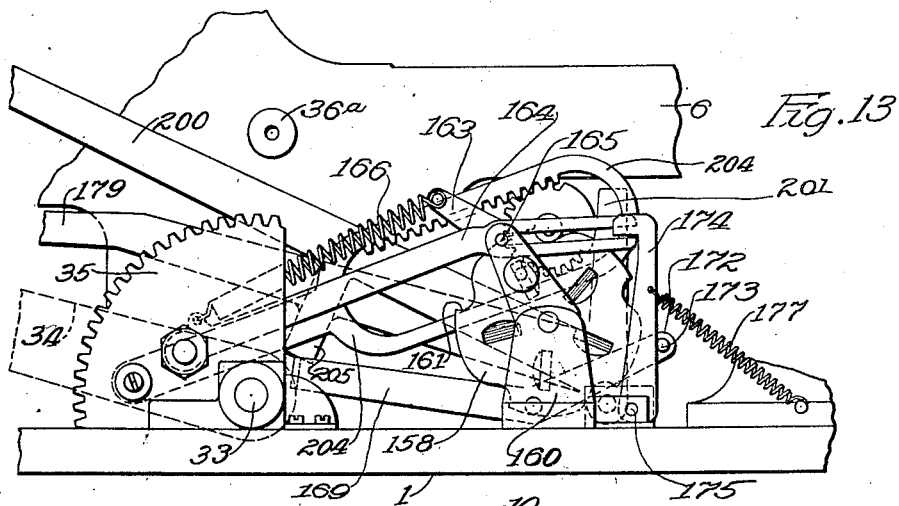
Figure 14:
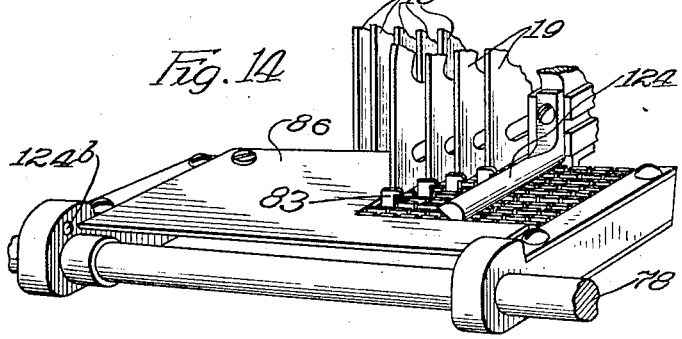
Figure 15:
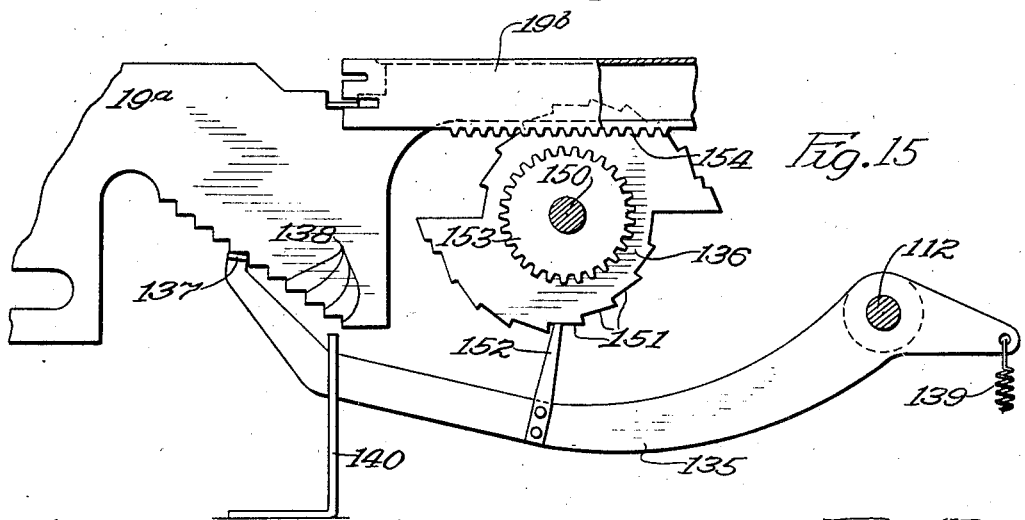

In the accompanying drawings, Figure 1 is a top plan view of one embodiment of the invention, with the inclosing casing, platen, paper guides, ribbon mechanism, paper reel, and correcting device omitted. Fig. 2 is a longitudinal vertical section. Fig. 3 is a side elevation of the mechanism. Fig. 4 is an elevation of the side opposite that seen in Fig. 3. Figs. 5 and 6 illustrate the operation of the full-stroke mechanism. Fig. 7 is a detail view of a certain stop. Fig. 8 is a transverse vertical sectional view of the mechanism. Fig. 9 is a detail sectional view. Fig. 10 is a detail view of a yoke comprised in the mechanism. Fig. 11 is a horizontal sectional view of the mechanism, with parts omitted. Fig. 12 is a side elevation, showing the parts in a different position from that represented in Fig. 2. Fig. 13 is a fragmental side view, showing certain parts in a position different from that indicated in Fig. 3. Fig. 14 is a fragmental perspective view of the mechanism in the position assumed in printing an item. Fig. 15 illustrates the totaling operation. Figs. 16 and 17 illustrate the adding and carrying operations. Fig. 18 is a plan view of the figure stop mechanism. Fig. 19 is a vertical section through said mechanism. Fig. 20 is a fragmental rear view of said mechanism. Fig. 21 is a fragmental plan view illustrating the escapement for said mechanism. Fig. 22 is a fragmental view of the adding mechanism. Figs. 23 and 24 are fragmental side and rear edge views of one of the printing elements. Fig. 25 is a sectional view of said element. Fig. 26 illustrates a portion of the clearing mechanism.

In the embodiment selected for illustration, the mechanisms are supported upon a base 1, the major portion of the mechanism being inclosed by a casing 2.

The printing mechanism includes a platen 3. The ribbon-supporting and feeding devices, paper guides and line-space means may be of the usual or any suitable form and hence are not illustrated herein. 4 denotes a paper reel to hold a roll of paper on which amounts may be listed. The line space shaft (not shown) is supported in bearings 5 formed in two parallel frame members 6 rigidly secured to the base 1. For convenience in assembling the machine, each frame member 6 consists of the two brackets $6^a$ $6^b$ and the side members $6^c$. The side members $6^c$ are secured together in parallel spaced relation by means of distance rods $6^d$ and screws $6^e$. This frame construction permits of assembling a considerable portion of the printing mechanism as a unit, and thereafter securing it in place by means of screws $6^f$ joining the side members $6^c$ to the brackets $6^a$ $6^b$.

The printing mechanism herein shown is adapted to print any amount up to and including nine digits. Accordingly, said mechanism comprises nine type-bars 7, one of which prints units, another tens, another hundreds, and so on. The type-bars are pivoted at their rear ends upon a pivot 8 carried in the rear portions of the brackets 6, said type-bars extending forwardly in parallel relation. Each type-bar has an upwardly extending forward end to which is secured a type-head which may consist, as shown in Figs. 23, 24, and 25, of two parallel sides 9, a front wall 10, a top wall 11 and a rear wall 12. The side and front walls are integral, as are the top and rear wall. As indicated in Figs. 24 and 25, the inner faces of the side walls are grooved to retain the rear wall in place. While the construction of type-head just described is advantageous, due to its simplicity and the facility with which it may be formed from sheet metal, it will be understood that any other suitable construction may be employed. The type-head may be secured to the type-bar in any preferred way, as by means of rivets 13.

Each type-head carries a vertical series of ten plungers, each of which consists of a rectangular block 14 having a type-face, a stem 15 and a cylindrical portion 16. Means to be later described is provided for forcing selected plungers rearwardly into contact with the ribbon extending in front of the paper on the platen 3. In order to retract the plungers there is provided for each plunger a coiled spring 17 interposed between the rear wall 12 and the portion 16, which spring normally holds the plunger forward, with the block 14 in contact with said rear wall. The portions of the side walls 9 extending rearwardly of the wall 12 constitute guide flanges which prevent rotational displacement of the plungers. The type-faces of each type-head bear the characters, 0 to 9, the series of characters beginning at the top of the head.

The front ends of the type-bars are maintained against lateral displacement by means of a comb 18, Fig. 2.

The type-bars 7 normally stand with the ciphers in the printing plane. In order to swing the type-bars upward to present any desired numerals in the printing plane, I provide nine type-bar-elevators or actuators 19, one for each type-bar. Said type-bar elevators may be mounted in any suitable way to slide forward and back; herein I have shown them as supported and guided by antifriction rollers 20 21 22 mounted on pivot shafts in the frame members 6. The forward portion of each type-bar-elevator is slotted as at 23 to receive one of the rollers 22. While the actuating connection between the type-bar and its elevator may be of various forms, that herein shown consists of an inclined or cam slot 24 in the elevator receiving an antifriction roller 25 on the type-bar. When the elevator is in its rearward position (Fig. 2) the roller 25 is in the lower end of the cam slot 24. Forward movement of the elevator causes the roller 25 to ascend in the slot, thus swinging the forward end of the type-bar upward to an extent commensurate with the length of the forward movement of the elevator. See Fig. 12.

For a purpose to appear hereinafter, each type-bar elevator, except the one for the units type-bar, is made in two sections, the forward section being indicated at 19$^a$ in Figs. 16 and 17, while the rear section is denoted by the character 19$^b$ in said figures. The section 19$^b$ is herein shown as formed from folded sheet metal and as being slidably mounted on the section 19$^a$. A finger 26 is affixed to the section 19$^b$. On the rear end of the section 19$^a$ is a lug 27 which extends up through a slot in the section 19$^b$. Movement of the section 19$^b$ relative to the section 19$^a$ is limited by contact of the lug 27 with the finger 26 and the end wall of said slot. 27$^a$ is a lug on the section 19$^a$ lying in a slot in the section 19$^b$ and serving to prevent upward displacement of the section 19$^b$.

Between the forward end of the section 19$^b$ and an adjacent portion of the section 19$^a$ is a toggle consisting of the links 28 and 29. This toggle is normally held straight by a coiled spring 30 anchored on the section 19$^a$ and connected to an arm 31 on the link 29. Means to be later described is provided to move the pivot joining the links 28 29 upward off dead center. A tension spring 32 somewhat stronger than the spring 30 and extending between the forward end of the section 19$^b$ and an adjacent point on the section 19$^a$ is capable of further flexing the toggle and drawing the section 19$^b$ forward as soon as the means above alluded to has operated. If desired, the springs 32 may be dispensed with, and the springs 48 hereinafter described may be relied upon to move the sections 19$^b$ with relation to the sections 19$^a$.

In the present embodiment of the invention, movement is imparted to the type-bar-elevators through the following agencies: A rock shaft 33 (Fig. 3) mounted in the framework has fixed thereto a hand crank 34 and a gear segment 35, the latter meshing with a segment 36 which is fixed with relation to a cam plate 37. The segment 36 and the cam plate 37 are mounted for oscillation on a pivot 36$^a$ (Fig. 13) projecting outwardly from one of the frame members 6.

Two levers 38 and 39 are pivoted on a bearing bracket 40 secured to the base 1. The lever 38 carries a roller stud which lies within a cam slot 41 in the cam plate 37. On the lever 39 is a roller 42 that lies in contact with the edge of the cam plate, said edge consisting of the cam portion 43 and the dwell 44.

A slide plate 45 (Figs. 2, 8 and 12) is mounted on grooved antifriction rollers 46 for horizontal reciprocation, forward and back. On the forward end of this slide plate is a pin 47 (Fig. 1) extending into a slot in the upper end of the lever 38. It will thus be seen that when the cam plate 37 is oscillated the slide plate 45 will be reciprocated.

The finger 26 of each of the type-bar-elevators is connected by means of a coiled spring 48 with a lug 49 (Fig. 8) on the slide plate 45. Forward movement of the slide plate will therefore cause the type-bar-elevators to be yieldingly drawn forward to the extent permitted by key-controlled stops hereinafter described. When the elevators are permitted to have their full forward movement, the springs 48 are not stretched or placed under tension greater than the normal amount, thus minimizing wear upon the springs. Rearward movement of the slide plate brings its rear edge into contact with the fingers 26, and thus returns to initial position any elevators that were previously moved forward.

A slide plate 50 is supported from the under side of the slide plate 45 by means of headed screw-studs 51 (Fig. 8) fixed in the plate 45 and extending through slots in the plate 50. The rear end of the plate 50 terminates in a flange 52 adapted to engage the lugs 27 on the sections $19^a$ of the type-bar-elevators. Near the forward end of the slide plate 50 is a pin 53 which extends into a slot in the upper end of the lever 39. It will thus be seen that when the lever 39 is swung rearwardly, the plate 50 will engage the lugs 27 and return to initial position the sections $19^a$ of any elevators that may have been advanced. After said sections have been returned, the continuing movement of the lever 38 and the slide plate 45 restores to initial position any sections $19^b$ that may have been advanced by the flexing of the toggle 28 29 (Fig. 17).

The means for forcing the types into printing contact with the ribbon will next be described.

Nine hammers 54 (Figs. 1 and 2), one for each type-head, are independently pivoted on a pivot 55 fixed in the frame members 6. As indicated in Fig. 1, each hammer is located in front of one of the type heads, in position to strike the type plunger which is in the printing plane. Each hammer is provided with a coiled spring 56 which tends to swing the hammer against the type plunger.

To hold the hammers in inoperative position, there is provided for each hammer a detent 57 pivoted on a rod 58, one end of the detent being adapted to lie in a notch 59 in the adjacent type-bar 7, and the other end of the detent being hooked to engage a finger 60 on the hammer.

A spring 61 tends to hold the detent in operative position. As the type-bar is elevated, the detent is rocked to release the finger 60. Compare Figs. 2 and 12. It will be noted from Fig. 12 that when the hammer is given its forward stroke, the finger 60 comes in contact with the spring 56, said spring and finger serving to prevent a second blow through rebound of the hammer.

In order to hold the hammers back until the type-heads have been elevated to the predetermined extent, I provide a detaining bail 62, the vertical side arms of which are pivoted on the rod 63, and the horizontal portion of which extends across the set of hammers and is adapted to enter notches 64 in the hammers. The bail 62 is swung out of engagement with the hammers by means of a reciprocating member 65 pivoted to the lever 38 at 66. The forward portion of said member is slidably supported by a stud $65^a$ (Fig. 3). The forward end of the member 65 is arranged to contact an adjustable stop 67 on the bail 62. It will be seen that when the lever 38 has nearly completed its forward swing, the member 65 strikes the stop 67 and swings the bail 62 out of the notches 64, whereupon those hammers which were released by the elevated type-bars spring upward and rearward, giving the type plungers a quick blow. A spring 68 moves the bail 62 toward its operative or locking position as soon as the reciprocatory member 65 is withdrawn from the stop 67, the movement of the bail under the action of said spring being limited by a stop pin 69 (Fig. 1). The lower corners of the hammers are rounded so as to slip past the bail 62 when the hammers are being restored.

The means for restoring the hammers comprises a bail 70, the side arms of which are mounted on the pivot 55, and the transverse portion of which extends behind the series of hammers. The bail 70 is swung to and fro by reason of a link (71) connection between the lever 38 and an arm 72 of the bail.

In the operation of the printing mechanism, one or more of the elevators 19 are advanced, thereby raising the corresponding type-bars 7, and actuating a corresponding number of detents 57 to release the same number of hammers 54, the latter, however, being still retained by the bail 62. The forward swing of the lever 38 also causes the restoring bail to swing to the position shown in Fig. 12. As the lever 38 completes its forward swing, the member 65 strikes the stop 67 and pushes the bail 62 out of the recesses 64, thus releasing those hammers which were previously released by the detents 57, and permitting said hammers to be projected suddenly against the type plungers by the springs 56. An impression of the type upon the paper is thus made. On the rearward swing of the lever 38, the type-bars are lowered and the bail 70 draws the released hammers back to initial position, in which they are retained by the bail 62. The return movement of the hammers also places the fingers 60 in engagement with the detents 57.

It will be remembered that the numerals to be printed are brought to the printing plane by advancing the desired type-bar-elevators 19 appropriate distances. The extent to which the elevators are advanced when an item is being printed, as in making a list of items, is determined by figure stops which are thrown into operation by means of keys depressed by the operator. There being, in this embodiment, nine type-bars, (one for each numerical order), each having ten positions, ninety stops are provided, one for each position of each type-bar. These stops are mounted in a frame or carriage 73 (Fig. 3), so as to be bodily movable, as a unit, transversely of the group of type-bar-elevators.

The carriage 73 may be of any suitable construction. Herein I have shown it as consisting of two end-pieces 74 75 (Fig. 20), a top plate 76 and a bottom plate 77 (Figs. 18 and 19) rigidly secured together. While the carriage may be supported in any preferred way, it is herein shown as slidably mounted at one side on a stationary guide rod 78 fixed in brackets 79 on the base 1. The end pieces 74 75 are provided with bearings 80 through which the guide rod 78 extends. The other side of the carriage is supported on a roller 81 which is mounted on a bracket 82 fixed to the base 1.

Each stop 83 consists, in this instance, of a pin vertically slidable in registering openings in the plates 76 77, downward movement of the pin in said openings being limited by an overhanging head or lug 84 (Fig. 20). The stops are frictionally retained in their operative (raised) and inoperative (lowered) positions by means of springs 85. Referring to Fig. 18: When raised, the stops in the vertical row which is farthest to the right prevent forward movement of those elevators whose type-bars are to print ciphers; the stops in the next row limit the forward movement of those elevators whose type-bars are to print ones; the stops in the next row determine the printing of twos; and so on.

In the initial position of the carriage 73, the group of stops 83 is at the right of the group of elevators 19 (Figs. 1 and 18). As each desired stop is raised into operative position, the carriage is moved to the left (by means to be later described) a distance equal to the distance between centers of adjacent stops, thereby bringing the raised stops into alinement with the corresponding number of elevators. For example, if the item "1000" is to be listed, the stops indicated by *a b* in Fig. 18 would be raised, and the carriage 73 would move four steps or spaces, thereby bringing said stops *a b* into alinement with the "units," "tens," "hundreds" and "thousands" elevators. When the entire group of elevators is released by the forward movement of the slide plates 45 50, the "units," "tens," "hundreds" and "thousands" elevators are advanced until the forward ends of said last mentioned elevators strike the stops *a b*. The remaining elevators are held back by means of a stop plate 86 pivoted to the carriage 73 at 87, the free edge of which plate is normally held above the horizontal plane of the lower edges of the elevators by means of a spring 88 (Fig. 20) which surrounds a headed screw stud 89 fixed in the plate 77 and bears at its ends against the plates 77 and 86. Upward movement of the stop plate 86 is limited by the head of the screw stud 89.

The key mechanism for setting (*i. e.* raising) desired stops 83 may be of any suitable character. That herein shown by way of example comprises ten key levers 90 (Figs. 2, 19 and 21) mounted on a pivot 91 carried by brackets 92 fixed to the base 1. The forward end of each key lever is connected to a digit-key 93 supported for vertical sliding movement in a frame or guide 94 which may be of any preferred construction. Springs 95 restore the individual digit-keys and key levers as soon as the keys are released by the operator.

The rear ends of the key levers 90 are bent to extend in a single line transversely of the path of movement of the carriage 73, the "cipher" key-lever being in the vertical plane of the row of "cipher" stops, the "one" key-lever being in the vertical plane of the row of "one" stops, and so forth. On the rear end of each key-lever (except the "nine" key-lever) is an upturned lug 96 adapted, when raised, to press against and raise a stop 83.

The means for moving the stop carriage 73 toward the left to bring raised stops 83 into alinement with the type-bar-elevators 19 comprises, in the present embodiment, a bell-crank lever 97 (Fig. 1) pivoted to the base 1 at 98, one arm of said lever being connected to the carriage 73 by a link 99, and the other arm of the lever being pivoted to a bar 100 which is guided for sliding movement in a guide 101 (Figs. 4 and 8) on the base 1. A spring 102 strained between a pin on the bar 100 and a pin on the base tends to swing the bell-crank lever in the direction to draw the carriage 73 to the left.

The means for controlling the movement of the carriage 73 under the influence of the spring 102 so that the carriage shall move step by step, is as follows:

A universal escapement plate 103 (Figs. 18 to 21) is pivoted on a pin 104 in a bracket 105 fixed to the base, said plate being normally tilted downward by a spring 106. The free edge of said escapement plate overlies a lug 107 on the end of each key-lever 90, whereby said plate is lifted whenever a digit-key 93 is depressed by the operator. On the escapement plate is an upturned lug 108 (Fig. 19) which is in the vertical plane of the row of "nine" stops 83. 109 (Figs. 20 and 21) is a stationary rail mounted on the base 1 in line with the row of "nine" stops 83 and above the horizontal plane of the lowered stops, but below the lower ends of the stops when the latter are set. See Fig. 20. The end 110 of the rail 109 constitutes a stop shoulder against which the spring 102 (acting through the bar 100, the bell crank 97 and the link 99) holds the foremost unset "nine" stop. The escapement formed by the plate 103, the shoulder 110 and the series of "nine" stops operates as follows: When a digit-key 93 is depressed by the operator, the escapement plate 103 is tilted upwardly, and the lug 108 of said plate pushes up the "nine" stop that is in contact with the shoulder 110. As soon as said stop is above the shoulder 110, the spring 102 moves the carriage 73 until the next "nine" stop strikes against the lug 108, as in Fig. 20. When the operator releases the digit-key, the spring 106 tilts the escapement plate 103 downward, thereby withdrawing the lug 108, whereupon the spring 102 moves the carriage 73 until the "nine" stop that stood against the lug 108 strikes the shoulder 110.

It will be seen that, for the sake of simplicity, the "nine" stops are utilized as part of the escapement. As an incidental result, a "nine" stop is set whenever any other stop is set.

It will be evident that the shifting movement imparted to the group of ninety stops 83 serves to bring all of the stops into position to be set by the ten digit-keys, thus rendering possible the use of a small number of digit-keys.

In the present embodiment of the invention, the means provided for returning the carriage 73 to its initial position comprises a cam 111 (Figs. 1, 4 and 8) rotatably mounted on a shaft 112 fixed in the framework of the machine. Preferably means is provided for preventing rotation of the cam 111 through momentum; herein I have shown a coiled spring 113 which bears at one end against the framework and at its other end against the hub of the cam, thus pressing the cam against a disk 114 fixed to the end of the shaft 112. The cam 111 has a suitable number of points (five, as herein shown) arranged to engage a roller stud 115 on the upturned end of the bar 100. It will be seen that when the cam is turned to carry one of the points thereof past the roller stud 115, the carriage 73 will be moved to its initial position, as in Figs. 1 and 18. The cam is turned, step by step, by means comprising a crank arm 116 (Figs. 1 and 4) fixed on the shaft 33, said crank arm having a stud 117 that lies in front of an arm 118 which is loosely mounted on the inner end of the shaft 33. To the upper end of the arm 118 is pivoted a bar 119 having a forked rear end to engage pins 120 set in the side of the cam 111. 121 is a stationary guide to prevent lateral displacement of the bar 119. A coiled spring 122, anchored, for convenience, to the bar 100, yieldingly holds the bar against upward displacement, while causing it to slide forward over the next pin 120 to be engaged, and to drop into engagement therewith, when the arm 116 swings forward. A pin 123 limits the forward movement of the arm 118 and the bar 119 by stopping against the guide 121. When the crank handle 34 is swung forward by the operator, the arm 116 is also swung forward, since both parts are fixed to the shaft 33; the spring 122 swings the arm 118 forward, and moves the bar 119 forward into engagement with the next pin 120 to be engaged. When the operator swings the handle 34 back to its initial position, the pin 117 swings the arm 118 rearwardly, thereby causing the bar 119 to push against the pin 120 and turn the cam 111 through a distance equal to the distance between two adjacent cam points.

When the carriage 73 is being returned to initial position, the group of stops 83 moves under a bar 124 (Figs. 3, 14 and 20) fixed to one of the brackets 6, and having an inclined face with which all the raised stops contact, and whereby said stops are forced downward to initial position.

Any suitable means may be provided to return the carriage 73 to its initial position in case the operator makes an error in setting the figure stops. Herein I have shown a bracket 124ª (Fig. 2) connected at its lower end to the carriage at 124ᵇ (Figs. 18 and 19), the upper end of the bracket carrying a finger piece 124ᶜ which extends through a horizontally elongated opening in the casing 2. Attached to the bracket is a pointer 124ᵈ that moves across a dial 124ᵉ. If the operator strikes the wrong key, he pushes the carriage 73 back to initial position, and begins anew the operation of setting the stops for the desired item.

It is sometimes desirable to list in succession two or more items of the same amount. In order to render such listing possible with a single actuation of the digit keys, I provide means for preventing the elevator stops 83 from being returned to initial position, which means comprises a "repeat" key-lever 125 (Figs. 1 and 4) pivoted at 126 and normally held elevated by a spring 127. A stop 128 (Fig. 7) limits the upward movement of said key-lever. In the lower edge of the "repeat" key lever is a notch 129 adapted to receive a pin 130 on the arm 118. When two or more duplicate items are to be listed, the operator, after depressing the proper digit-keys 93, depresses the "repeat" key; and then, while holding said key down, oscillates the handle 34 once for each similar item to be listed. When the lever 125 is depressed, the notched portion 129 engages the pin 130 and prevents the bar 119 from turning the cam 111. The carriage 73 therefore remains in its set position and presents the same stops to the elevators 19 each time the latter are advanced. The operator holds the "repeat" key depressed until after beginning the forward swing of the handle 34 to print the last of the duplicate items; after the "repeat" key has been released, the rearward or return stroke of the handle 34 causes the carriage 73 to be restored to initial position and the set stops 83 to be lowered in the manner hereinbefore described.

Any suitable means may be employed to insure that the handle 34 shall not be given less than a full-stroke. Herein I have shown a sector 131 (Figs. 4, 5 and 6) fixed to the base 1; and a dog 132 pivoted on an extension 133 of the arm 116, said dog being adapted to engage the teeth of the sector. A spring 134 holds the dog in contact with the sector. The different positions of the dog when the handle 34 is being oscillated are indicated in Figs. 5 and 6. It will be seen that the direction of movement of the handle 34 cannot be reversed until the dog has passed the end of the sector and the handle has completed its full movement in that direction.

I have now described all of the mechanisms that are concerned in the printing of a column of items. In order that the sum of the items may be mechanically computed and printed, there is provided mechanism including a series of nine total-stops 135 (Figs. 2, 11 and 15), one for each type-bar-elevator 19, which stops are adapted to limit the forward movement of the elevators when a total is to be printed. Each of the total-stops has ten positions, corresponding to the ten different positions assumed by the elevator in printing from zero to nine. The proper positions of the total-stops for printing a given total are determined by nine stop-wheels 136 arranged to be rotated in the advance movements of the type-bar-elevators that are used in printing the items to be added.

Each total-stop 135 consists of a lever loosely mounted on the shaft 112 so that said lever may be swung up to present a stop lug 137 in the horizontal plane of ten stop-shoulders 138 on the adjacent elevator 19. When raised into the plane of the topmost shoulder 138, the stop lug 137 prevents movement of the elevator, and thus holds the corresponding type-bar in position to print a cipher. When raised into the plane of the lowest shoulder 138, the lug 137 permits the elevator to make its full forward movement, thus placing the type-bar in position to print a nine. The total-stops are raised by springs 139. Lateral displacement of the total stops is prevented by combs 140 141. The total-stops are normally held in lowered (inoperative) position by means of a spring 142 (Fig. 4) acting upon an arm 143 fixed to a bail 144 (Figs. 2 and 11), the side arms of which bail are loosely mounted on the shaft 112, and the transverse portion of which bail lies across the total-stops. 145 (Figs. 1, 4 and 11) is a "total" key lever pivoted at 146 and engaging a stud 147 on the bail 144. When the operator desires to print a total, he dpresses the "total" key, thereby raising the bail 144, and permitting all of the total-stops 135 to swing up under the influence of the springs 139 and assume the positions determined by the stop wheels 136 to be presently described. The depression of the "total" key also carries a finger 148 into contact with the stop plate 86, whereby said plate is swung down out of the way of the elevators 19. Depression of the "total" key also brings the "total" key lever into contact with a finger 149 (Fig. 4) on the "repeat" key lever 125, thus causing said "repeat" lever to engage the pin 130 on the arm 118, and prevent a needless rotation of the cam 111.

The stop wheels 136 (Figs. 15, 16 and 17) by which the upward swing of the total-stops is limited in accordance with the total to be printed are rotatably mounted on a shaft 150. Each stop wheel has two semicircular series of stop shoulders 151, the shoulders of each series being located at different distances from the center of the wheel. On each total-stop 135 is a finger 152 adapted, when the total-stop is raised, to make contact with one of the ten shoulders 151 on the stop wheel. It will thus be seen that the extent of the upward movement of the total-stop will depend upon the position of the stop wheel.

The stop wheels are rotated through connections with the type-bar-elevators 19. While these connections may be of any suitable character, I have herein shown a gear connection consisting of a pinion 153 fixed to each stop wheel and adapted to mesh with rack teeth 154 formed on the units type-bar-elevator 19 and on the section 19b of each of the other elevators. The pinions 153 and stop wheels 136 are rotated during the forward movement of the elevators, but not during the return movement, to obtain which result the shaft 150 is mounted in a yoke 155 (Figs. 8 and 10) which is pivoted on a shaft 156 (Fig. 2) in the framework of the machine. A spring 157 (Fig. 8) normally holds the yoke 155 down with the pinions 153 out of mesh with the rack teeth 154. To move the pinions into mesh with the racks just before the elevator or elevators begin to advance, I provide a cam wheel 158 (Figs. 1, 3 and 8) mounted on a pivot 159 fixed in a bracket 160. In the periphery of said cam wheel are several notches 161 (five, in the present embodiment) adapted to receive a roller 162 on the end of the shaft 150. When said roller is in a notch 161, as in Figs. 3 and 8, the pinions 153 are out of mesh with the rack teeth 154; when the cam wheel 160 is turned, the roller 162 rides up on the circular peripheral portion between the notches 161, whereby the pinions 153 are raised into mesh with the rack teeth, and remain in such mesh until the roller drops into the next notch.

The means for rotating the cam wheel 158 comprises, in this instance, an arm 163 (Figs. 3, 8 and 13) mounted to swing on the pivot 159, said arm being swung in one direction by a link 164 pivoted at one end on the segment 35 and slotted at its other end to fit upon a pin 165 in the arm 163; said arm being swung in the opposite direction by a spring 166 connecting the arm to a point on the link 164. This spring normally holds the pin 165 against the end wall of the slot in the link 164. On the arm 163 is a spring plunger 167 (Fig. 9) adapted to enter ratchet notches 168 in the side of the cam wheel 158, whereby when the arm is swung forward the cam wheel is rotated, while rearward movement of the arm causes the plunger to slip out of one notch and into the next. It will thus be seen that when the handle 34 is swung forward, the spring 166 draws the arm 163 forward, thereby turning the cam wheel and raising the pinions 153 into mesh with the racks; and that when the handle 34 is swung back to its initial position, the link 164, pushing against the pin 165, swings the arm 163 rearwardly.

When a total is to be printed, the stop wheels 136 must be stationary during the forward movement of the type-bar-elevators, and therefore the shaft 150 must not be raised to place the pinions in mesh with the racks; hence means is employed to prevent the arm 163 from swinging forward when the handle 34 is swung forward to print a total. This means, in the present embodiment, comprises a universal bail 169 (Figs. 2, 11 and 13) pivoted at 170 171 (Fig. 8). One side arm of said bail has an extension 172 carrying a pin 173 that lies behind a detent 174, said detent being pivoted at 175 and being adapted when swung forward to engage the projecting end of the pin 165 in the arm 163. A spring 177 normally holds the detent against the pin 173 and out of engagement with the pin 165. On the "total" key lever 145 is a finger 178 (Figs. 2 and 11) which depresses the bail 169 when the "total" key lever is depressed, thus forcing the detent 174 into engagement with the pin 165 and preventing movement of the cam wheel 158. When the key lever is released, the spring 177 withdraws the detent 174 and returns the bail 169 to normal position.

When it is desired to print an item without having the item added to those previously printed, the operator, before swinging the handle 34 forward, depresses a "non-add" key-lever 179 (Figs. 3, 11 and 13) pivoted at 180 (Figs. 8 and 11) and normally held elevated by a spring 181. On the "non-add" key lever is a finger 182 (Fig. 11) adapted to bear against the universal bail 169. When the "non-add" key is depressed by the operator, the bail 169 causes the detent 174 to restrain movement of the cam wheel 158 and thus prevents the stop wheels from being rotated in the advance movement of the type-bar-elevators used in printing the item which is not to be added. Downward movement of the lever 179 is limited by contact of the stop finger 179$^a$ with the base 1.

To illustrate the adding operation, we may assume that the items "3" and "4" are to be listed and added. All of the stop wheels 136 are in the initial position shown in Fig. 2, in which position the stop shoulder $c$ (Fig. 17) of each stop wheel is in position to be engaged by a finger 152. The operator depresses the digit-key for the numeral "3", thus setting one of the stops 83. He then pulls the handle 34 forward, thereby advancing the units elevator 19 until the latter strikes the set stop 83, and causing the units type-bar to print "3". During such advance movement the units stop wheel 136 is rotated through the distance of three stop shoulders so as to place the shoulder $d$ in position to be engaged by the finger 152 of the units total-stop 135. After returning the handle 34, the operator depresses the digit key for the numeral "4", and by again swinging the handle forward causes the units type bar to print "4" and the units stop wheel to rotate through the distance of four stop shoulders until the shoulder $e$ is in position to be engaged by the finger 152 of the units total-stop 135. The operator then depresses the "total" key, thereby raising all of the fingers 152 into contact with the stop wheels, the finger 152 on the units total-stop lever 135 rising into contact with the shoulder $e$ of the units stop wheel and the remaining fingers engaging the shoulder $c$ of the remaining stop wheels. Holding the "total" key down, the operator swings the handle 34 forward, thereby advancing the units elevator until the shoulder $f$ of said elevator strikes against the lug 137 of the units total-stop. The units elevator is then in position for printing the total "7".

If it be desired to print an item of, say, "8", and add it to the other two items, the carrying mechanism to be next described causes the tens stop wheel to rotate through the distance of one stop shoulder while the units stop wheel is rotating through the distance of eight stop shoulders. Said carrying mechanism includes eight levers 183 (Figs. 16 and 17) one for each elevator except the units elevator, said levers being pivoted at their rear ends on a rod 184 fixed in the members 6. The forward end of each lever 183 is slotted as at 185 to receive a stud 186 carried by the arm 31 of the toggle 28 29 of its particular type-bar-elevator. On each stop wheel 136, following the shoulder corresponding to the position for printing "9", is a cam surface 187 adapted to engage a roller 188 on the adjacent lever 183.

Assuming now that the item "8" is to be printed, the operator proceeds to print said item, and in so doing the units stop wheel is rotated through the distance of eight stop shoulders or until the shoulder $g$ (which is the shoulder corresponding to "5") is in position to be engaged by the finger 152 of the units total-stop. While the units stop wheel is thus rotating, the cam 187 thereon lifts the roller 188 on the adjacent lever 183, thereby flexing the toggle 28 29 of the tens type-bar-elevator off dead center, whereupon the spring 32 pulls forward the section 19$^b$ of said tens elevator to the extent permitted by the lug 27. Since the rack teeth of said section 19$^b$ are in mesh with the tens stop-wheel pinion, the tens stop-wheel will be rotated, the extent of rotation being sufficient to place the shoulder corresponding to "1" in position to be engaged by the finger 152 of the tens total-stop. Consequently, when the total is taken, the fingers 152 of the tens and units total stops will engage the stop shoulders corresponding to 1 and 5, respectively, and the total of 15 will be printed. In the same manner, the hundreds accumulated by the tens stop wheel are carried to the hundreds stop wheel, and so on.

It will be noted that the carrying mechanism is actuated in the forward or active stroke of the elevators 19, and is restored in the return stroke of said elevators, no special operation of the elevators 19 or handle 34 being necessary.

Any suitable means may be employed to prevent rotation of the stop wheels through momentum as, for example, levers 189 (Fig. 2) pivoted on the rod 156 and each carrying a roller engaging the teeth of one of the pinions 153. Springs 190 acting on the rear ends of the levers 189 yieldingly press the rollers against the pinions.

When a new column or list of items is to be started all of the stop wheels 136 must be restored to initial position. The means herein shown for restoring the stop wheels comprises a plurality of clutch members 191 (Figs. 2 and 22), one for each pinion 153, said clutch members being keyed on the shaft 150. In Fig. 22 some of the parts are spaced apart for the sake of clearness. Each clutch member has a spring tooth 192 adapted to enter either of two ratchet notches 193 formed in the side of the adjacent pinion. All of the clutch teeth 192 are alined longitudinally of the shaft 150, hence it will be seen that in the course of a half-revolution of the shaft in a counter-clockwise direction (Fig. 2), the clutch teeth 192 will engage all of the pinions and rotate all of the stop wheels into alinement. When the shaft 150 is at rest, the clutch teeth 192 are either in the position shown in Fig. 2 or the position diametrically opposite; therefore in the rotation of said shaft all of the stop wheels will be lined up in the initial position. The shaft 150 is rotated by means herein shown as comprising a pinion 194 (Fig. 22) rotatably mounted on the shaft 150, said pinion having on one side two diametrically opposite ratchet clutch teeth 195 adapted to engage a spring tooth 196 carried by a clutch collar 197 which is slidably mounted on the shaft 150. 198 is a pin forming a driving connection between the collar 197 and the shaft 150. A coiled spring 199 normally holds the collar 197 with the tooth 196 out of engagement with the tooth 195. The means for moving the clutch collar 197 into clutch engagement with the pinion 194 comprises a key lever 200 pivoted at 180 (Fig. 8) and having an arm 201, said arm having a beveled edge 201$^a$ (Fig. 26) adapted to bear against the tapered surface 202 of the clutch collar. A spring 203 normally holds the arm 201 out of contact with the collar. The pinion 194 is rotated by means of a bar 204 pivoted to the segment 35 and having a loop in which the pinion is located, one side of the loop being rack-toothed to mesh with the teeth of the pinion. It will be seen that the bar 204 is guided and supported by the pinion. On the lever 200 is a finger 205 adapted to depress the bail 169 and thus operate the detent 174 in order to retain the pinions in the lowered position during the clearing operation.

When the operator desires to "clear" the adding mechanism, he depresses the key lever 200 to clutch the shaft 150 to the pinion 194 and, while holding said key lever depressed, he swings the handle 34 forward, thereby rotating the pinion 194, the shaft 150, the clutch members 191, the pinions 153 and the stop wheels 136. In order to insure that the shaft 150 shall be given at least one half-revolution, the handle 34 may be given two forward movements.

While the present embodiment of the invention has been described with considerable particularity, it will be understood that the invention is not limited to the arrangement and constructions herein set forth, since various changes may be made by those skilled in the art, without departing from the spirit of the invention.

The printing mechanism herein disclosed will be claimed in my copending application Serial No. 110,823 filed July 24th, 1916.

I claim as my invention:

1. The combination of a plurality of pivoted type bars; a plurality of reciprocatory members, each having a cam slot therein; means on each type bar engaging the cam slot in one of said members; means for controlling the movement of said members; and an adding wheel having a gear connection with each of said members.

2. The combination of a plurality of movable actuators; a shaft; a series of totaling wheels mounted on said shaft, each of said wheels being adapted to have a gear connection with one of said actuators; a wheel upon the periphery of which the shaft is supported, said wheel having a notch in its periphery, the totaling wheels and actuators being out of gear connection when the shaft is in said notch; and means for rotating said wheel to raise and lower the shaft to place the totaling wheels and actuators into and out of gear connection.

3. An adding machine having, in combination, a plurality of movable members; wheels rotatable by said members in the item-movements of the latter, each wheel having a series of stop portions at different distances from the axis of the wheel, each of said members having a series of stop portions thereon; a set of devices adapted to be positioned in engagement with the stop portions of said wheels and adapted to be engaged by the stop portions on said member; and a hand lever and connections for positioning said devices.

4. The combination of a plurality of pivoted type bars; a plurality of reciprocatory actuators, each having a cam connection with one of the type bars; stops for limiting the movement of said actuators; and means for setting the stops.

5. The combination of a plurality of pivoted type bars; a plurality of reciprocatory members, each having a cam slot therein; means on each type bar engaging the cam slot in one of said members; and means for controlling the movement of said members.

6. The combination of a plurality of pivoted parallel type bars; an equal number of parallel reciprocatory members arranged below the type bars and each having a cam slot therein; means on each type bar engaging the cam slot of one of the reciprocatory members; and means for controlling the extent of movement of said members.

7. The combination of a carriage; a series of figure stops on said carriage; a spring for giving said carriage an adjusting movement; and an escapement for controlling the movement of said carriage, said escapement including certain of said stops.

8. The combination of a carriage; a series of figure stops on said carriage; a spring for giving said carriage an adjusting movement; a pivoted member adapted to set successive stops, a stationary member against which the foremost unset stop is arranged to bear, and means for setting the remainder of the stops, said means being arranged to actuate said pivoted member.

9. The combination of a carriage; a series of figure stops on said carriage; a spring for giving said carriage an adjusting movement; a pivoted escapement plate adapted to set successive stops; a stationary member against which the foremost unset stop is arranged to bear; key levers for setting the remainder of the stops, said key levers being arranged to tilt said plate to set successive stops; and means for restoring said pivoted plate to its normal position.

10. The combination of a carriage; a series of figure stops on said carriage; a spring for giving said carriage an adjusting movement; a series of key levers having their ends arranged in a line extending transversely of the path of movement of the carriage, certain of said levers having lugs adapted to contact and set certain of said stops; a pivoted escapement plate; lugs on said levers underlying said escapement plate, said escapement plate having a lug adapted to set certain of the stops; a stationary member against which the unset stop adjacent the one set by said plate is arranged to bear; and means for swinging said plate to its normal position.

11. The combination of a reciprocatory units actuator and a reciprocatory tens actuator, the tens actuator being of sectional construction; means for causing relative movement between the sections of the tens actuator; a locking toggle for preventing relative movement between said sections; a lever having a stationary pivot, said lever being slotted in the direction of reciprocation of the actuators; a member on said toggle and slidable in said slot; two totaling wheels, each arranged to be driven by one of said actuators; and means on the totaling wheel for the units actuator for swinging said lever to positively flex said toggle.

12. The combination of printing means including movable actuators; a carriage arranged for movement transversely of the path of movement of the actuators; stops on said carriage for controlling the movement of the actuators; a pivoted stop on said carriage located in advance of the other stops and adapted to prevent movement of the actuators, and key-operated means for swinging said stop out of the path of movement of the actuators.

13. The combination of printing means including movable actuators; a carriage arranged for movement transversely of the path of movement of the actuators; a stop plate pivoted on said carriage and extending in front of the series of actuators; a series of individual stops on said carriage located in rear of the other stop, having reference to the direction of movement of the carriage, whereby as the carriage is moved the first mentioned stop is withdrawn from successive actuators and individual stops brought into operative relation to the actuators; means for setting the individual stops, and means for swinging said stop plate on its pivot when a total is to be taken.

14. The combination of a plurality of movable actuators, each having a plurality of total stop portions thereon; a series of pivoted levers, one for each actuator, each lever adapted to engage any one of said stop portions; totaling wheels driven by said actuators for determining the position of said levers; and means for swinging said levers into contact with said totaling wheels and thereby placing said levers in the path of movement of said stop portions.

15. The combination of printing means including a plurality of movable actuators; a shaft; a series of totaling wheels mounted on said shaft; a pinion for each of said wheels, each of said actuators having a rack portion adapted to mesh with the teeth of one of said pinions; a wheel upon the periphery of which the shaft is supported, said wheel having a notch in its periphery, the pinions being out of mesh with the rack portions when the shaft is in said notch; and means for rotating said wheel to raise and lower the shaft to place the pinions into and out of mesh with the rack portions.

16. The combination of printing means including a plurality of movable actuators; a shaft; a series of totaling wheels mounted on said shaft; a pinion for each of said wheels, each of said actuators having a rack portion adapted to mesh with the teeth of one of said pinions; a wheel upon the periphery of which said shaft is supported, said wheel having a notch in its periphery, the pinions being out of mesh with the rack portions when said shaft is in said notch; a crank handle for operating the printing means; and means operated in the printing stroke of said handle for turning said wheel to raise the shaft to place the pinions into mesh with the rack portions.

17. The combination of printing means including a plurality of movable actuators; a shaft; a series of totaling wheels mounted on said shaft; a pinion for each of said wheels, each of said actuators having a rack portion adapted to mesh with the teeth of one of said pinions; a wheel upon the periphery of which said shaft is supported, said wheel having a peripheral notch, the pinions being out of mesh with the rack portions when said shaft is in said notch; a crank handle for operating the printing means; means yieldingly connected with the handle for turning said wheel; and means for preventing movement of said wheel.

18. An adding machine having, in combination, a group of adding pinions, racks adapted to mesh with the adding pinions, means for rotating the pinions to zero position, a clutch interposed between the pinions and the rotating means, means for operating the clutch, means for disengaging the racks and the pinions, and means operable by the clutch-operating means for maintaining such disengagement of the racks and pinions during the operation of the pinion-rotating means in returning the pinions to zero.

19. An adding machine having, in combination, a group of adding pinions, racks adapted to mesh with the pinions, means for rotating the pinions to zero position, a clutch interposed between the pinions and the rotating means, a key for throwing in the clutch, means for disengaging the racks and the pinions, and means operable by said key for maintaining such disengagement of the racks and pinions during the operation of the pinion-rotating means in returning the pinions to zero.

20. The combination of printing means including a plurality of parallel reciprocatory actuators; a series of stops to limit the movement of said actuators in printing items, each actuator having a series of stop portions thereon; a series of total stops, one for each of said actuators, each of said total stops being adapted to engage one of said stop portions; and means for automatically setting the total stops.

21. The combination of printing means including a plurality of movable actuators, each having a plurality of stop portions thereon; a series of pivoted levers, one for each actuator, each lever adapted to engage any one of said stop portions; totaling wheels driven by said actuators for determining the position of said levers; and means for swinging said levers into contact with said totaling wheels.

22. The combination of a series of pivoted type bars; a like number of reciprocatory actuators arranged below the type bars and each having a cam connection with a type bar for swinging the latter; a series of stops located in front of the series of actuators for limiting the forward movement of said actuators; means for setting said stops; and totaling means located below and actuated by the actuators.

23. In an adding and listing machine, in combination, a plurality of pivoted type bars, each type bar having a forward upwardly-extending end; types carried by the forward upwardly-extending end of each type bar and movable in a substantially horizontal plane; a platen located above the type bars and behind the vertical plane of the type-carrying ends thereof and forwardly of the pivot for said type bars; actuators rectilinearly-reciprocable in a horizontal plane below the type bars, each actuator having an operating connection with one of the type bars at a point between the opposite ends of the type bar; totaling wheels arranged below the actuators and adapted to be driven by the actuators; means for moving the actuators; means for limiting forward movement of the actuators; and means to cause the types to print.

24. An adding machine having, in combination, a shaft, a series of wheels loosely mounted on said shaft, a series of clutch members fixed on said shaft one for each of said wheels, a driving wheel also loosely mounted on said shaft, a clutch element fixed against rotation on the shaft, and means for moving said clutch element relative to the shaft into operative engagement with said driving wheel; whereby when the driving wheel is rotated in one direction said shaft and clutch members are rotated to position the first mentioned wheels.

25. An adding machine having, in combination, a shaft, a series of wheels loosely mounted on said shaft, a series of clutch members one for each of said wheels fixed on said shaft and arranged to engage said wheels when the shaft is rotated in one direction, to position the wheels, a driving wheel also loosely mounted on said shaft, and a clutch element fixed against rotation on the shaft and arranged to be moved relative thereto into engagement with said driving wheel for rotation thereby in the direction to rotate said series of wheels.

26. An adding machine having, in combination, a shaft, a series of wheels loosely mounted on said shaft, a driving wheel also loosely mounted on said shaft, key-controlled means connecting said driving wheel to said shaft to rotate it in one direction, and means for engaging said series of wheels to rotate them into a predetermined relation when said shaft is rotated by said driving wheel.

In testimony whereof I affix my signature in the presence of two witnesses.

GUSTAF DAVID SUNDSTRAND.

Witnesses:
 EARL C. CARLSON,
 GEORGE L. CHINDAHL.